United States Patent
Lemberg

(10) Patent No.: US 8,290,473 B2
(45) Date of Patent: Oct. 16, 2012

(54) REMOTELY MODIFYING DATA IN MEMORY IN A MOBILE DEVICE

(75) Inventor: Vyacheslav Lemberg, Long Grove, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 1310 days.

(21) Appl. No.: 11/981,375

(22) Filed: Oct. 31, 2007

(65) Prior Publication Data

US 2009/0111491 A1    Apr. 30, 2009

(51) Int. Cl.
    *H04M 1/66*    (2006.01)
(52) U.S. Cl. ........ 455/410; 455/411; 455/466; 707/687; 707/698
(58) Field of Classification Search .......... 455/410, 455/411, 418, 419, 420, 412.1, 414.1, 466; 349/188; 707/609, 687, 698, 705, 747, 781, 707/783; 713/150, 151, 182, 183, 184
    See application file for complete search history.

(56) References Cited

U.S. PATENT DOCUMENTS

| 6,397,054 | B1 | 5/2002 | Hoirup et al. | |
|---|---|---|---|---|
| 6,662,023 | B1 | 12/2003 | Helle | |
| 6,725,379 | B1 | 4/2004 | Dailey | |
| 6,741,851 | B1* | 5/2004 | Lee et al. | 455/410 |
| 6,975,204 | B1 | 12/2005 | Silver | |
| 6,986,050 | B2* | 1/2006 | Hypponen | 713/183 |
| 7,233,671 | B2* | 6/2007 | Wu | 380/270 |
| 7,299,037 | B2* | 11/2007 | Hospes | 455/419 |
| 7,373,138 | B2* | 5/2008 | Haub et al. | 455/411 |
| 2002/0147918 | A1* | 10/2002 | Osthoff et al. | 713/193 |

OTHER PUBLICATIONS

Ryan Glabb et al; Multi-mode Operator for SHA-2 Hash Functions; Journal of Systems Architecture; vol. 53 Issue 2-3 Feb.-Mar. 2007; p. 127-138.

* cited by examiner

*Primary Examiner* — Jean A Gelin
*Assistant Examiner* — Michael S Bush

(57) ABSTRACT

Methods and corresponding systems in a mobile device for remotely modifying data stored in the mobile device include receiving a message in the mobile device. The message can be a short message service (SMS) message. The message is compared to a secret message, wherein the secret message is a hash value output by a hash function, wherein inputs to the hash function include a text string and a secret text string. The text string can be an e-mail address, and the secret text string can be a password of the mobile device. In response to the message matching the secret message, data stored in memory in the mobile device is modified to prevent unauthorized access. A secret message cancellation can be received in the mobile device to cancel a scheduled memory modification. Memory modification can include erasing data, replacing data, or encrypting data.

21 Claims, 2 Drawing Sheets

REMOTELY MODIFYING DATA IN MEMORY IN A MOBILE DEVICE

BACKGROUND

1. Field

This disclosure relates generally to wireless communication systems and equipment, and more specifically, to techniques and apparatus for securely, remotely modifying data in memory in a mobile device.

2. Related Art

Mobile devices, such as mobile phones, smart phones, and mobile computers, are becoming increasingly popular platforms that can be used to store and process many forms of data, including user data, confidential data, data related to a person's identity, and other types of data. If such stored data is lost, stolen, or otherwise comes into the possession of an unauthorized user, the consequences can be serious. Such user data can be used to steal a person's identity, steal corporate secrets, and potentially cause many other problems.

Thus, for these and other reasons, it can be useful to be able to securely and remotely modify data stored in memory in a mobile device in order to protect the data from unauthorized disclosure or use.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
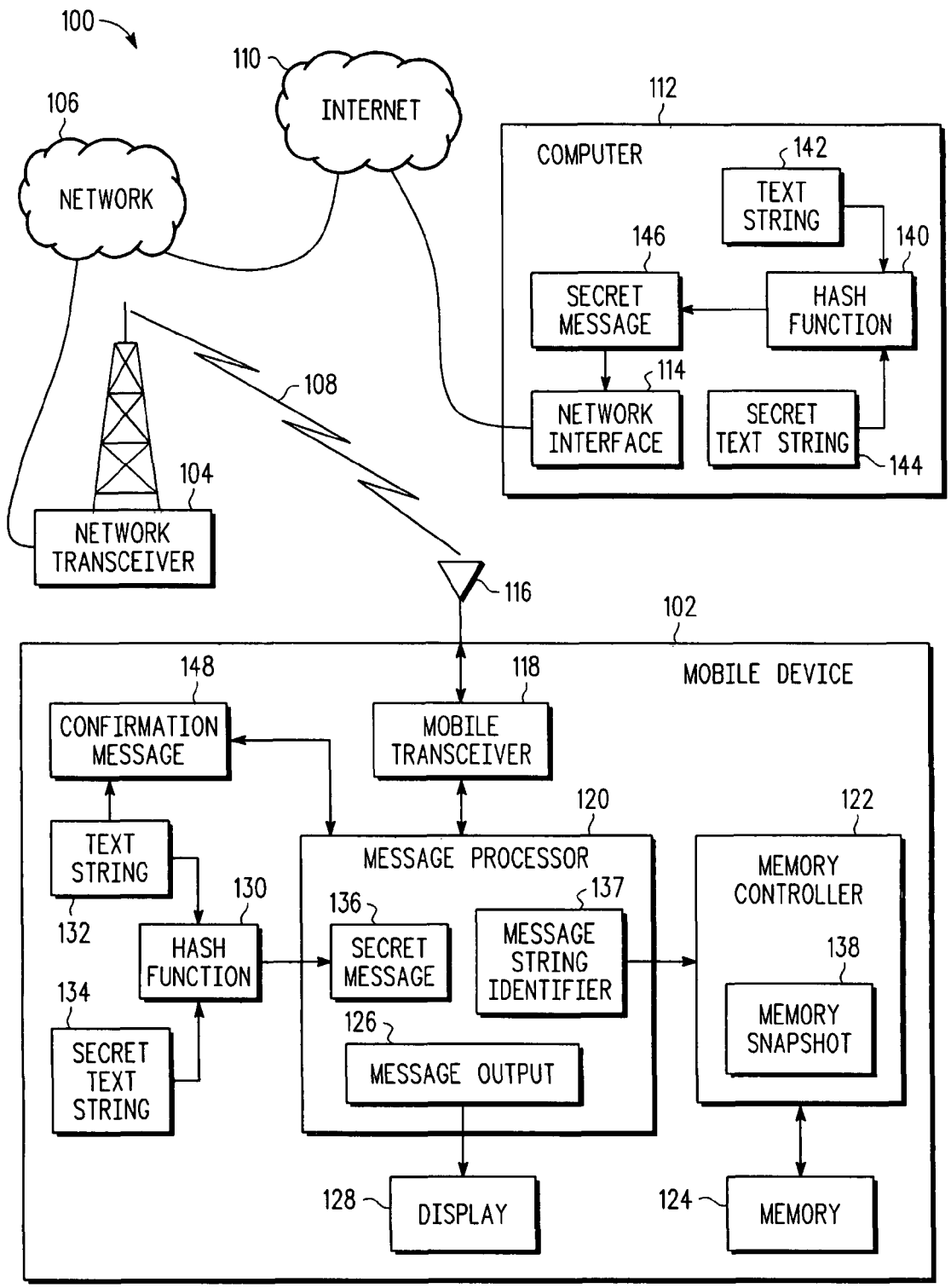
FIG. 1 is a high-level block diagram of a communication network having one or more mobile devices adapted to remotely modify data stored in memory in the mobile device in accordance with one or more embodiments.

Referring to FIG. 1, a high-level block diagram of portions of a communication network 100 in accordance with one or more embodiments will be briefly discussed and described. As shown, communication network 100 can include mobile device 102, which can communicate wirelessly with network transceiver 104. Network transceiver 104 can be coupled to network 106, wherein network 106 can include other similar wireless network transceivers in order to provide wireless network coverage over a network service area. In one embodiment, network transceiver 104 can be a base station coupled to a cellular network (e.g., network 106) for providing wireless communications using a wireless signal 108 to communicate with a cellular phone (e.g. mobile device 102, or other similar wireless device that can be used in a cellular network).

Network 106 can be coupled to Internet 110 (or other networks, e.g., wide area networks or local area networks (LANs), or combinations thereof) for communicating various types of data with mobile device 102, which data can include data representing messages transferred by a short message service (SMS), e-mail, websites, voice, music, video, documents, data exchanged between game players, chat, and the like.

Computer 112 can be coupled to Internet 110 by any one of various known means, such as a dial-up connection, a digital scriber line (DSL), a cable modem, a wireless data card, a satellite link, and other similar data communication methods. Network interface 114 in computer 112 can be used to provide a suitable communication link between computer 112 and Internet 110. Computer 112 can also be a mobile device, similar to mobile device 102, which is connected to Internet 110 by a wireless communication link, similar to the wireless communication link represented by wireless signal 108.

Mobile device 102 can include antenna 116 coupled to mobile transceiver 118 for transmitting and receiving wireless signal 108, to or from, respectively, network transceiver 104. In various embodiments, mobile transceiver 118 can be implemented in hardware (including analog and digital circuits), firmware, hardware and software, or any suitable combination thereof suitable for receiving radio frequency signals and outputting baseband signals or data, and conversely receiving baseband signals or data and outputting radio frequency signals for transmission. In various embodiments, wireless signal 108 can be a wireless signal that conforms to one of several different standards for cellular telephones, such as, standards based upon Code Division Multiple Access (CDMA) standards promulgated by the Third Generation Partnership Project 2 (3GPP2), which is a collaborative third-generation telecommunications specifications-setting project involving several well-known organizations that support specifications for radio transmission technologies, and standards based upon Global System for Mobile communication (GSM) standards promulgated by the Third Generation Partnership Project (3GPP), and the like. Wireless signal 108 can also conform to various other wireless data transmission standards, such as 802.11 and 802.16 wireless data standards promulgated by organizations including the Institute of Electrical and Electronics Engineers (IEEE), the American National Standards Institute (ANSI), or other similar standards development organizations.

Mobile transceiver 118 can be coupled to message processor 120, which message processor can facilitate sending and receiving messages, to and from mobile device 102, and for other message processing in accordance with one or more embodiments. In various embodiments, message processor 120 can be implemented in hardware, firmware, hardware and software, or any suitable combination thereof. In one embodiment, message processor 120 can receive data from, and send data to, mobile transceiver 118, wherein the data can represent messages, such as SMS messages, which message service is supported by the particular standard used for wireless signal 108. In other embodiments, message processor 126 can support other message formats, such as e-mail messages, chat or instant messages, and the like.

Message processor 120 can include message output function 126, which can be used to provide output signals that can be used to drive display 128 in order to provide a user interface to display information for message input and output. In various embodiments, message output function 126 can be implemented in hardware, firmware, hardware and software, or any suitable combination for accepting inputs and driving a display or other output device in response to the inputs. In one embodiment, display 128 can be implemented with a liquid crystal display (LCD), or an organic light-emitting diode (OLED), or other suitable display technology. In some embodiments, message output function 126 can use other interfaces, such as text-to-speech or speech-to-text processors, touch screens, and other suitable interfaces.

Mobile device 102 can also include memory controller 122, which can be used to control the reading and writing of data in memory 124, and other data modification functions in accordance with one or more embodiments. In various embodiments, memory controller 122 can be implemented in hardware, firmware, hardware and software, or any suitable combination thereof. Memory 124 can be used to store various types of data, which can include data representing pictures, music, address book data, word processing files, database files, spreadsheet files, calendar files, and other similar files that can be stored in a mobile device such as a telephone, smart phone, personal digital assistant (PDA), palmtop computer, laptop computer, and the like. In some embodiments, memory controller 122 can control access to data, or can control the encryption of data, or can control the erasure, modification, or replacement of data.

One function that can be used to securely, remotely modify data in memory in mobile device 102 is hash function 130. In various embodiments, hash function 130 can be implemented in hardware, firmware, hardware and software, or any suitable combination thereof. Hash function 130 can receive two or more text strings, such as text string 132 and secret text string 134, and produce an output, shown as secret message 136. Receiving a message that matches secret message 136 in mobile device 102 can initiate a process of data modification to secure data stored in mobile device 102 in accordance with one or more embodiments.

A hash function is a reproducible method or algorithm for turning data (e.g., input data such as text strings, files, or other data sets that can represent a variety of digitally stored objects) into a (relatively) small number (e.g. an output string comprising relatively few characters) that may serve as a digital "fingerprint" of the data input into the hash function. The algorithm substitutes or transposes the data to create such fingerprints, which can be referred to as a message digest, hash sum, hash value, hash code, hash, or as described in the embodiment herein, secret message. More specifically, hash functions can operate in two or more stages, e.g., preprocessing and hash computation. Preprocessing can include or involve, e.g., preparing the message through padding for the proper length, parsing the padded message into m-bit blocks, and setting any initialization values to be used in the hash generation. The hash computation operates to generate a message schedule from the padded message and uses that message schedule, possibly along with additional functions, constants, and word operations using working variables, to iteratively generate a series of intermediate hash values. The final hash value or last intermediate hash value generated by the hash computation is used to determine the message digest (i.e., the secret message).

In one embodiment, hash function 130 can be implemented using one of a group of well-known hash functions known by the acronym "SHA," which stands for Secure Hash Algorithm. SHA hash functions are cryptographic hash functions designed by the National Security Agency (NSA) and published by the National Institute of Standards and Technology (NIST) as a U.S. Federal Information Processing Standard. The Secure Hash Standards include, e.g., SHA-224, SHA-256, SHA-394, and SHA-512. If hash function 130 is more specifically implemented with an SHA hash function referred to as "SHA-224," secret message 136 output will be 28 bytes in length.

Text string 132, which is one input into hash function 130, can be implemented, in one embodiment, with a message address, such as an e-mail address, an SMS address, an instant messaging address, an Internet protocol address, or the like. In other embodiments, other text strings can be used, such as a user name, a command directed to the mobile device, or the like, wherein text string 132 can be public information (i.e., not secret). If text string 132 is a message address, a confirmation message, which is described more completely below, can be sent to the message address to confirm actions taken within mobile device 102. In various embodiments, text string 132 or storage therefore can be implemented in hardware, firmware, hardware and software, or any combination thereof suitable for accepting a text string (possibly including software needed to prompt the user for inputting the text string) and outputting the text string to hash function 130, or confirmation message processor 148, or other functions that may use the text string.

Secret text string 134, which is another input into hash function 130, can be implemented in one embodiment with a personal identification number (PIN), or other similar password or secret character string (i.e., a character string intended to be unknown to unauthorized persons). In other embodiments, hash function 130 can have more than two inputs, but for increased security, at least one of the inputs should be a secret text string that is not publicly known, or easily derived. In various embodiments, secret text string 134 or storage therefore can be implemented in hardware, firmware, hardware and software, or any combination thereof suitable for accepting a secret text string (possibly including software needed to prompt the user for inputting the secret text string) and outputting the secret text string to hash function 130, or other functions that may use the secret text string.

Message processor 120 can also include message string identifier 137, which can be used to identify a received message that matches a secret message stored at secret message 136, or other similar messages that may be stored at 136. In various embodiments, message string identifier 120 can be implemented in hardware, firmware, hardware and software, or any combination thereof suitable for comparing a received message or portion thereof to one or more secret messages that have been produced as an output of hash function 130. Thus, message string identifier 137 contains a compare function that compares messages received from mobile transceiver 118 to one or more messages stored in secret message 136. In response to detecting a match, message string identifier 137 can send a message to memory controller 122 to initiate a memory modification operation to modify data stored in memory 124, thereby preventing the data from misappropriation.

In some embodiments, memory controller 122 can include memory snapshot 138. Memory snapshot 138 can be data or information representing a predetermined state of memory 124, which can be used to overwrite or otherwise modify the contents of memory 124 to reset mobile device 102 to a predetermined condition, such as an initial condition that existed at the manufacturing or initial deployment of mobile device 102. In various embodiments, memory controller 122 can be implemented in hardware, firmware, hardware and software, or any combination thereof suitable for receiving commands or data related to memory modification and in response thereto controlling the modifying of data stored in memory 124.

In order to calculate a secret message corresponding to the secret message stored at 136 in mobile device 102, computer 112 (i.e., a computing device that can support a hash function including data input and output) can include hash function 140, which is a hash function that corresponds to hash function 130 within mobile device 102, receives inputs from text string 142 and secret text string 144 in order to produce secret message 146. Hash function 140, which uses a hash algorithm corresponding to hash function 130 in mobile device 102, can have an output coupled to network interface 114 for sending secret message 146, which corresponds to message string 136, to mobile device 102, as described more completely below.

In another embodiment, hash function 140, can be located on a computer or server within Internet 110. If hash function 140 is in Internet 110, text string 142 and secret text string 144 can be input by a user (e.g., a user of a misplaced mobile device 102) using a browser on computer coupled to Internet 110. For example, a hash function hosted on Internet 110 can be hosted by a service provider for mobile device 102, and users may input text string 142 and secret text string 144 using an Internet browser interface running on a computer or other similar device that supports a web browser, wherein a webpage hosted by the service provider prompts the user for the information needed.

In some embodiments, mobile device 102 can include confirmation message processor 148, which can be used for sending confirmation messages to confirm a memory modification operation, or to confirm a cancellation of a memory modification operation, or to confirm other similar operations. In various embodiments, confirmation message processor 148 can be implemented in hardware, firmware, hardware and software, or any combination thereof suitable for creating or retrieving information related to addressing a confirmation message, and confirming an operation in mobile device 102; producing a confirmation message from such information; and sending the confirmation message to message processor 120 (or other suitable function) for transmission. Confirmation message processor 148 can be coupled to text string 132 in order to receive an address (e.g., an e-mail address, short message address, instant messenger address, or the like) used to send the confirmation message. Confirmation message processor can also be coupled to message processor 120 for receiving instructions to produce a particular message, and for transferring data representing an appropriately addressed message. When message processor 120 receives the message and the address, message processor 120 can send the message via mobile transceiver 118.

Figure 2:
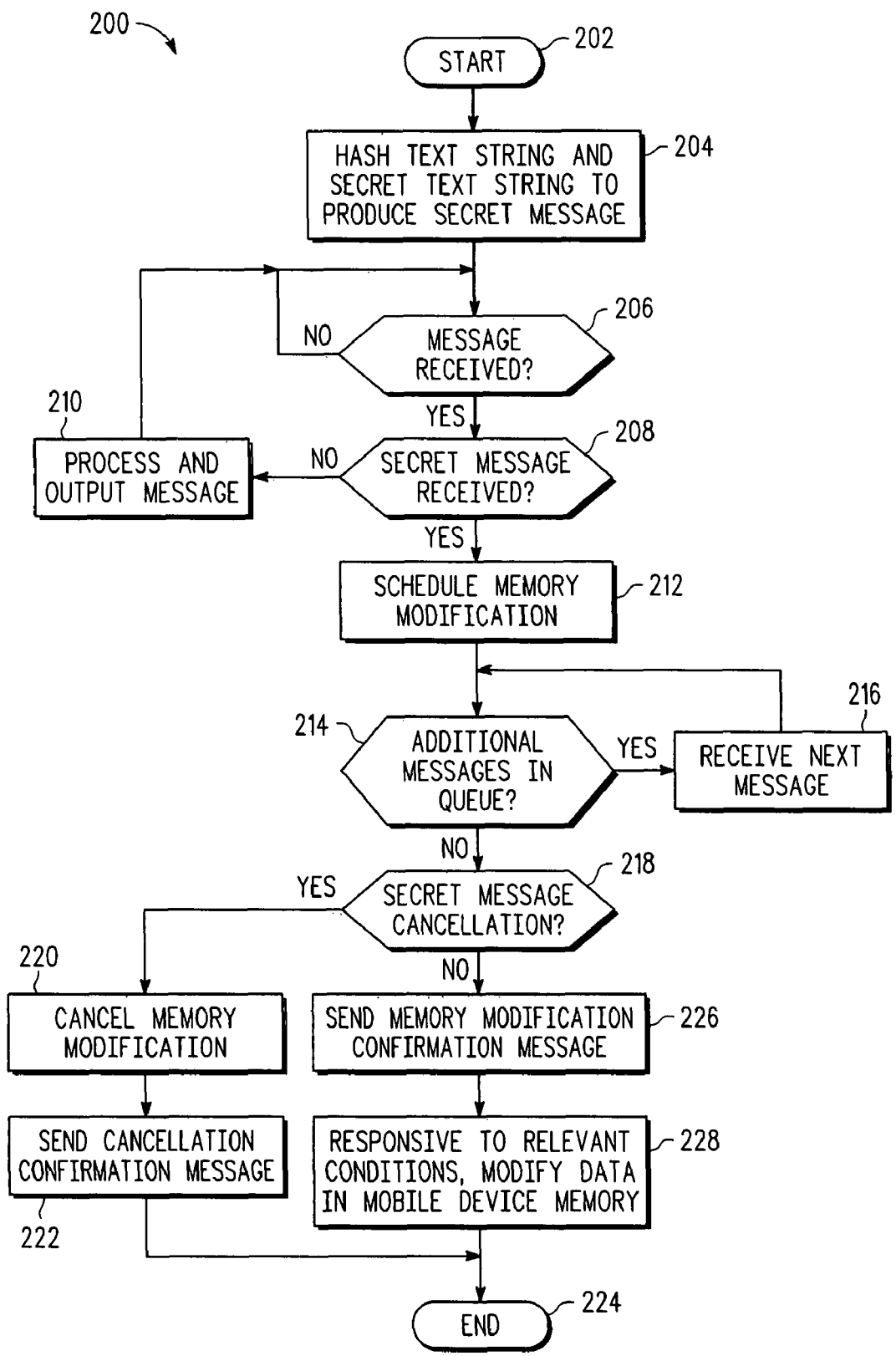
FIG. 2 is a flowchart of processes of modifying data stored in memory in a mobile device in accordance with one or more embodiments.

Referring to FIG. 2, there is depicted a high-level flowchart 200 of processes that can be executed in mobile device 102 (see FIG. 1), or other similar systems with appropriate functionality, in accordance with one or more embodiments. As shown, process 200 begins at 202, and thereafter passes to 204, wherein the process can use a hash function to hash a text string and a secret text string to produce a secret message. In one embodiment, a hash function known as SHA-224 can be used to implement hash function 130, as shown in FIG. 1. Hash function 130 can use text string 132 and secret text string 134 as inputs to produce secret message 136 as an output. Text string 132 can, for example, be an e-mail address or another type of message address, and secret text string 134 can, for example, be a password or PIN associated with mobile device 102. In another embodiment, text string 132 can be a text string representing a command that can be executed by mobile device 102, such as a memory modification command, or a command to cancel a scheduled memory modification, or the like.

In some embodiments, mobile device 102 can use a graphical user interface (GUI) on display 128 to prompt the user to input text string 132 (e.g., one or more e-mail addresses) and secret text string 134 (e.g., a secret password) as part of a setup operation to prepare mobile device 102 for receiving a secret message to cause memory modification to protect data in memory. After inputting text string 132 and secret text string 134, hash function 130 can output secret message 136 (e.g., a hash value output by hash function 130), which can then be stored in mobile device 102 (e.g., in secret message 136), and used by message string identifier 137 to compare with incoming messages from mobile transceiver 118. Secret message 136 can also be temporarily displayed on display 128 so that the user can write it down or otherwise store it so that it can later be sent in a message to mobile device 102 if mobile device 102 becomes lost or stolen. If SHA-224 is used in hash function 130, secret message 136 is conveniently 28 characters in length, which is a good compromise between being too long to copy down and send in a message, and being so short that the security of the message is compromised by a risk of an errant message accidentally modifying memory.

Next, the process can determine whether a message has been received in the mobile device, as illustrated at 206. In one embodiment, the process can determine whether an SMS message has been received in mobile device 102. In other embodiments, at 206 the process can determine whether an e-mail, or chat message, or other similar message has been received. If a message has not been received in mobile device 102, the process can iteratively loop, as shown by the "no" branch from 206, until a message has been received.

If a message has been received, the process passes to 208, wherein the process determines whether a secret message has been received in the mobile device. In one embodiment, the process can use message string identifier 137 in message processor 120 (as shown in FIG. 1) to compare the received message to secret message 136 to determine whether the secret message has been received. Typically, a user of the device will send the secret message to mobile device 102 if it is lost or stolen. The secret message can be sent by directly entering the secret message character string into a device for sending messages (e.g., another mobile device that can send SMS messages), or the secret message can be sent from computer 112 by entering the same text string 142 and secret text string 144 that was entered into mobile device 102 in the setup process (e.g., entering the contents of text string 132 and secret text string 134). Alternatively, an application hosted within Internet 110 can hash the same text and secret text strings and respond to the user accessing and entering the data into a hash function and a secret-message-sending function via a web browser.

If the process determines at 208 that the secret message has not been received, the received message can be processed and output, as depicted at 210. In one embodiment, message output function 126 can be used to process and output the received message to display 128, or another suitable output device coupled to mobile device 102. After processing and outputting the message, the process can return to 206 to await the receipt of the next message.

If the process determines that the secret message has been received at 208, the process can, in some embodiments, schedule a memory modification operation, as illustrated at 212. If the process schedules a memory modification, rather than immediately modifying memory following the receipt of the secret message, there can be an opportunity to cancel the memory modification by sending a secret message cancellation to the mobile device. The secret message cancellation can be useful in the case where the mobile device is lost, and the secret message to modify the memory has been sent but has not been received in the mobile device (e.g. the mobile device is turned off, out of power, or out of range of wireless signals), and the mobile device is later recovered and the memory modification is no longer needed or desired.

In one embodiment, the memory modification operation can be scheduled in message processor 120. The memory modification operation can be scheduled either for a particular time (e.g., at 12 o'clock, or in 10 minutes, or the like), or it can be scheduled upon satisfying particular conditions precedent (e.g., scheduled after the execution of particular tasks, or after checking for reception of a secret message cancellation, or after verifying that the memory modification has not been canceled, and the like).

Next, the process can determine whether additional messages are in a message queue, as illustrated at 214. In one embodiment in which SMS messages are received, a portion of the SMS message (e.g., a field in the format of the message) can include data that indicates that there are additional messages queued for transmission to mobile device 102 from network transceiver 104 and network 106 (see FIG. 1). In some embodiments, messages in the message queue can be located in network 106 (including transceiver 104). In other embodiments, messages in the queue can be located within mobile device 102 (i.e., queued messages that have already been received in message processor 120 by mobile device 102).

If there are additional messages in the queue for mobile device 102, the process passes to 216 to recall or receive a next message. After receiving the next message, the process can iteratively pass to 214 to check for additional messages in the queue. The queue may be in the network or in the mobile device. If the queue is in the mobile device, the next message can be recalled from an internal buffer.

Once there are no additional messages in the queue as determined at 214, the process passes to 218 to determine whether there is a secret message cancellation received by the mobile device. The secret message cancellation can be a message sent to mobile device 102 in order to cancel any memory modification that is scheduled to occur due to sending the secret message to mobile device 102.

In one embodiment, the secret message cancellation string can be created using hash function 130 in a manner similar to the creation of secret message 136, and message string identifier 137 can also be used to identify the cancellation message in message processor 120 (see FIG. 1) by comparing each received message in the message queue to the secret message cancellation, which secret message cancellation can also be stored in secret message 136, or in another similar register within message processor 120. For example, secret message cancellation can be produced by using the SHA-224 algorithm (e.g. hash function 130) with inputs comprising a secret text string (e.g. secret text string 134), and a text string (e.g., text string 132) that can, for example, be the word "cancel." After the secret message cancellation has been calculated, it can be displayed on display 128 (the same as with the secret message) so that the user can save it for future use.

The secret message cancellation can be useful because in some cases a stolen or misplaced mobile device may be retrieved or found after the secret message has been sent, but before the mobile device has modified memory (perhaps because the battery in the mobile device has run down). The absence of memory modification can be evident by the fact that a memory modification confirmation message has not been received. At this point, the user may not want to modify the memory, but may want to cancel memory modification as a result of sending the secret message. Thus, in some embodiments, before the mobile device is able to receive the secret message, the user may be able to send a secret message cancellation to cancel the memory modification.

If the process determines that the secret message cancellation has been received in the mobile device, the process can cancel the scheduled memory operation as shown at 220, and send a cancellation confirmation message to a messaging address associated with the secret message cancellation, as shown at 222. Canceling the memory modification operation can be implemented by removing the memory modification operation from a list of scheduled tasks to be performed, wherein the tasks are to be performed either at a particular time, or performed after satisfying conditions precedent. Removing the memory modification operation from a list of scheduled tasks to be performed can ensure that scheduled conditions (or relevant conditions, or conditions precedent) will not be met, thereby preventing the modification of data in the memory of the mobile device.

In one embodiment, the process can send the cancellation confirmation message to an e-mail address (or addresses) that has been stored in text string 132, or otherwise preconfigured in message processor 120. In one embodiment, text string 132 can contain one or more e-mail addresses separated by a delimiter (e.g., a comma, semicolon, space, or the like). After sending the cancellation confirmation message, the process passes to 224, wherein the process ends without memory modification.

If, at 218, the process determines that the secret message cancellation has not been received in the mobile device, the process can send a memory modification confirmation message to a messaging address (or addresses) associated with the secret message, as illustrated at 226. In one embodiment, the process can send the cancellation confirmation message to an e-mail address that has been stored in text string 132, or otherwise preconfigured in message processor 120. The memory modification confirmation message can be used to inform the user associated with mobile device 102 that the memory has been modified in order to protect data stored in memory 124.

After sending the memory modification confirmation message, the process can modify data in mobile device memory at the scheduled time, or when the scheduled conditions are met, in order to prevent a security breach, as depicted at 228. In one embodiment, memory controller 122 can be used to erase some or all of the data stored in memory 124 in order to protect the data from falling into unauthorized possession.

In another embodiment, memory controller 122 can overwrite some or all of the data in memory 124 according to a data image, or data modification instructions, stored in memory snapshot 138. Data stored in memory snapshot 138 can be used to restore or reset data in memory 124 to a condition that existed when mobile device 102 was initially manufactured.

In another embodiment, memory controller 122 can be used to encrypt data stored in memory 124 so that the data does not fall into unauthorized possession, but also so that the data can be recovered if mobile device 102 is returned to the owner, or other authorized person, who is in possession of a password to decrypt the data.

Increased security from transmitting the output of hash function 130 (e.g., the secret message) to mobile device 102 can help prevent mischievous or malicious deactivation or memory erasure in mobile device 102. Other approaches for modifying memory can include sending a command and device identifier, which when detected initiate memory erasure. This information may be obtained by others or when transmitted can be intercepted and misappropriated by eavesdroppers. Once obtained the information can be used to maliciously modify a mobile device memory. The secret message (a hash function output) is more difficult for others to obtain or otherwise generate or intercept and thus more difficult to misappropriate. Thus it is more difficult for someone to mischievously or maliciously corrupt the memory of the mobile device. Furthermore, using the hash function output does not disclose a security code for the device, which security code can be used for various operations.

Although the invention is described herein with reference to specific embodiments, various modifications and changes can be made without departing from the scope of the present invention as set forth in the claims below. For example, while the techniques and apparatus for remotely modifying memory in a mobile device may vary widely, one or more embodiments can be used in cellular telephone networks, wireless networks, and Internet networks. Accordingly, the specification and figures are to be regarded in an illustrative rather than in a restrictive sense, and all such modifications are intended to be included within the scope of the present invention. Any benefits, advantages, or solutions to problems that are described herein with regard to specific embodiments are not intended to be construed as a critical, required, or essential feature or element of any or all of the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for remotely modifying data stored in a mobile device comprising:
   receiving a message from a remote source in the mobile device;
   comparing the message to a secret message, wherein the secret message is a hash value output by a hash function, wherein inputs to the hash function include a text string and a secret text string; and
   in response to the message matching the secret message, modifying data stored in memory in the mobile device,
   wherein the comparing the message to the secret message, wherein the secret message is a hash value output by the hash function, wherein inputs to the hash function include the text string and the secret text string, and further wherein the hash function is operable for preprocessing the text string and the secret text string to produce blocks, and generating the hash value from the blocks using word operations and working variables.

2. The method for remotely modifying data according to claim 1 wherein the receiving a message in the mobile device comprises receiving a short message service (SMS) message in the mobile device.

3. The method for remotely modifying data according to claim 1 wherein the comparing the message to the secret message comprises comparing the message to a secret message that includes the hash value output by the hash function, wherein inputs to the hash function include an email address and the secret text string.

4. The method for remotely modifying data according to claim 1 wherein the comparing the message to the secret message comprises comparing the message to a secret message that includes the hash value output by the hash function, wherein inputs to the hash function include the text string and a password associated with the mobile device.

5. The method for remotely modifying data according to claim 1 wherein the modifying data stored in memory comprises erasing data stored in the memory.

6. The method for remotely modifying data according to claim 1 wherein the modifying data stored in memory comprises setting data stored in the memory to a predetermined state.

7. The method for remotely modifying data according to claim 1 wherein the modifying data stored in memory comprises encrypting data stored in the memory.

8. The method for remotely modifying data according to claim 1 further comprising sending a memory modification confirmation message from the mobile device.

9. A method for remotely modifying data stored in a mobile device comprising:
   receiving a first message in the mobile device;
   comparing the first message to a secret message, wherein the secret message is a hash value output by a hash function, wherein inputs to the hash function include a text string and a secret text string;
   in response to the first message matching the secret message, scheduling a memory modification operation for execution in response to scheduled conditions;
   receiving a second message in the mobile device;
   comparing the second message to a secret message cancellation;
   in response to the second message matching the secret message cancellation, cancelling the memory modification operation; and
   in response to the scheduled conditions being met, modifying data stored in memory in the mobile device.

10. The method for remotely modifying data according to claim 9 wherein the receiving the first message, and the receiving the second message, in the mobile device comprises receiving a first short message service (SMS) message, and receiving a second SMS message in the mobile device.

11. The method for remotely modifying data according to claim 9 wherein the comparing the first message to the secret message comprises comparing the first message to a secret message that includes the hash value output by the hash function, wherein inputs to the hash function include an email address and a password.

12. The method for remotely modifying data according to claim 9 wherein the modifying data stored in memory comprises erasing data stored in the memory.

13. The method for remotely modifying data according to claim 9 wherein the modifying data stored in memory comprises setting data stored in the memory to a predetermined state.

14. The method for remotely modifying data according to claim 9 wherein the modifying data stored in memory comprises encrypting data stored in the memory.

15. The method for remotely modifying data according to claim 9 further comprising sending a memory modification confirmation message from the mobile device in response to the scheduled conditions being met.

16. The method for remotely modifying data according to claim 9 further comprising sending a memory modification cancellation message from the mobile device in response to the cancelling of the memory modification operation.

17. The method for remotely modifying data according to claim 9 wherein the comparing the first message to the secret message, wherein the secret message is a hash value output by the hash function, wherein inputs to the hash function include the text string and the secret text string, and further wherein the hash function is operable for preprocessing the text string and the secret text string to produce blocks, and generating the hash value from the blocks using word operations and working variables.

18. A system for remotely modifying data in a mobile device comprising:
   a memory;
   a mobile transceiver for receiving messages from a remote source;
   a message processor coupled to the mobile transceiver for processing the messages;
   a hash function having inputs coupled to a text string and a secret text string, and having a hash function output coupled to the message processor;

a message string identifier coupled to the message processor for comparing a message received by the mobile transceiver to a secret message output by the hash function output; and a memory controller coupled to the memory and coupled to the message string identifier, wherein the memory controller is adapted to modify data in the memory in response to a match between the message received by the mobile transceiver and the secret message output by the hash function output, wherein the hash function is operable for preprocessing the text string and the secret text string to produce blocks, and generating the secret message from the blocks using word operations and working variables.

19. The system for remotely modifying data according to claim 18 further comprising a confirmation message processor coupled to the text string and to the message processor for producing a memory modification confirmation message for sending to an address corresponding to the text string.

20. The system for remotely modifying data according to claim 18 wherein the message processor coupled to the mobile transceiver comprises a short message service (SMS) message processor coupled to a mobile transceiver for receiving SMS messages.

21. The system for remotely modifying data according to claim 18 wherein the memory controller comprises a memory controller adapted to erase data in the memory in response to the match between the message received by the mobile transceiver and the secret message.

* * * * *